United States Patent
Klare et al.

(10) Patent No.: US 6,172,887 B1
(45) Date of Patent: *Jan. 9, 2001

(54) CIRCUIT FOR SUPPLYING POWER, WITHOUT THE NEED FOR A BATTERY, TO THE ELECTRONIC CONTROL UNIT OF A MACHINE DRIVEN BY AN INTERNAL-COMBUSTION ENGINE

(75) Inventors: Hartmut Klare, Benzhausen; Andreas Singer, Fraureuth, both of (DE)

(73) Assignee: Dolmar GmbH, Hamburg (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/930,779
(22) PCT Filed: Apr. 12, 1996
(86) PCT No.: PCT/EP96/01557
  § 371 Date: Dec. 8, 1997
  § 102(e) Date: Dec. 8, 1997
(87) PCT Pub. No.: WO96/32774
  PCT Pub. Date: Oct. 17, 1996

(30) Foreign Application Priority Data

Apr. 12, 1995 (DE) .......................... 295 06 350 U

(51) Int. Cl.$^7$ ..................................... H02M 7/00
(52) U.S. Cl. ................................. 363/74; 363/49; 323/299
(58) Field of Search ..................... 322/16, 28; 290/40 C; 323/268, 299; 363/15, 34, 49, 74

(56) References Cited

U.S. PATENT DOCUMENTS 5,157,321 * 10/1992 Kato et al. .............................. 322/28
5,543,703 * 8/1996 Kusase et al. ........................ 322/16

FOREIGN PATENT DOCUMENTS 38 41 610   6/1990 (DE) ............................... H02P 9/48

* cited by examiner

*Primary Examiner*—Jessica Han
(74) *Attorney, Agent, or Firm*—McCormick, Paulding & Huber LLP

(57) ABSTRACT

A circuit arrangement (10) for the batteryless power supply of the electronic control of a portable machine driven by an internal combustion engine, which machine possesses a d.c. voltage generator driven by the internal combustion engine, which delivers a generated voltage dependent on the number of revolutions of the internal combustion engine, which is transferred to a rated d.c. voltage (Vcc). The circuit arrangement (10) includes a first rectifier circuit (D1, C1), which converts the generator voltage (Ug) into an intermediate d.c. voltage (Uz), which permits the same, without booster batteries, to reliably and controllably supply the electronics of an engine-driven machine, especially in the starting phase, with the requisite rated d.c. voltage.

8 Claims, 1 Drawing Sheet

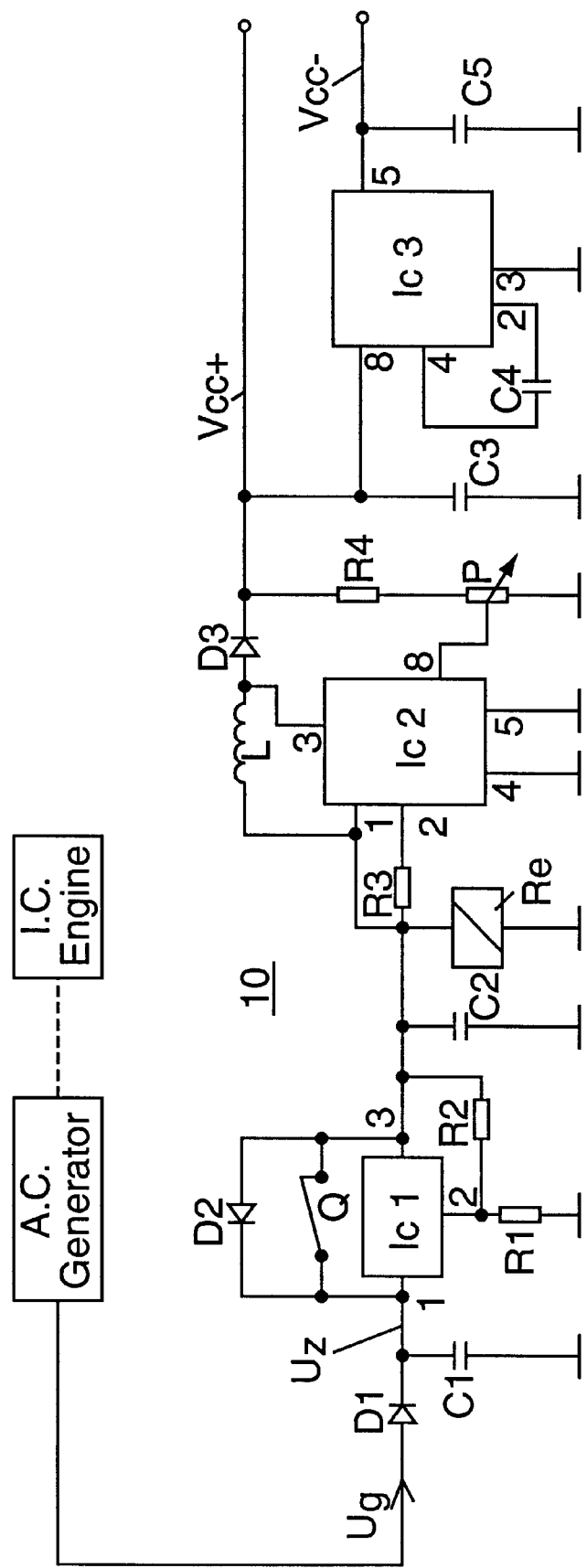

CIRCUIT FOR SUPPLYING POWER, WITHOUT THE NEED FOR A BATTERY, TO THE ELECTRONIC CONTROL UNIT OF A MACHINE DRIVEN BY AN INTERNAL-COMBUSTION ENGINE

The present invention relates to the area of engine driven machines. It relates to a circuit arrangement for the batteryless power supply of the electronic control of a machine driven by an internal combustion engine and, more particularly, to a portable machine with a rated direct voltage. The machine possesses an a.c. voltage generator driven by the internal combustion engine which delivers a generated voltage dependent upon the revolutions per minute of the internal combustion engine. The circuit arrangement comprises a first rectifier switch which converts the generated voltage into an intermediate d.c. voltage.

BACKGROUND OF THE INVENTION

A circuit arrangement of the type referred to above is known for the area of motor vehicle engineering from the German patent publication DE-A1-38 41 610.

In combustion-engine machines, electrical energy is required, for the operation of controls which typically is made available from batteries or is generated by generators driven by the engine. The employment of batteries, especially in portable machines, entails an additional expense, particularly as the long-term storage volume is limited. Moreover, in the batteryless operation as is provided in the DE-A1-38 41 610 publication for a motor vehicle, the voltage generated by the normal generator through the starting process does not provide sufficient energy for operating additional controls. However, this will be necessary in the future when engines with injection valves are more commonly used in order to actuate a valve or the like.

The applicants have designed a power supply for an electrically-controlled chain saw which dispenses additional energy. In this case, however, it did prove disadvantageous that a part of the ignition energy was used for the starting process so that, on account of the power withdrawal connected herewith, the starting behavior deteriorated. Since, in the case of portable machines, the starting behavior significantly affects operating comfort, such a solution is not devoid of problems.

Thus, an objective of the invention is to provide a circuit arrangement which permits a reliable power supply, without the employment of booster batteries, which can deliver power in the starting phase with the requisite rated d.c. voltage and which, at the same time, is simple and sturdy in its construction.

SUMMARY OF THE INVENTION

According to the invention, novel circuit arrangement comprises first means which are disposed in series with a first rectifier circuit and which generates with a low-running level of revolutions per minute, the rated d.c. voltage from an intermediatate d.c. voltage by means of controlled upward transformation for so long as the intermediate d.c. voltage is lower than the nominal d.c. voltage.

Through upward transformation, the first means are capable of generating the requisite rated d.c. voltage from the low intermediate d.c. voltages which, in the starting phase may constitute, for example, merely 20% of the rated d.c. voltage. Once the engine attains its higher idling speed it is possible to circumvent the first means to provide the rated d.c. voltage directly through speed regulation from the intermediate d.c. voltage.

According to a preferred embodiment of the invention, the first means comprise a switching controller connected to a switching controller interacting with a serially disposed inductance coil as well as a second rectifier circuit mounted in series with the same. By means of the switched mode of operation, the switching controller generates elevated voltage peaks in the inductance coil which are rectified and result in an upwardly transformed output d.c. voltage. When the rated d.c. voltage is reached at the switching controller output, the switching controller discontinues its function and the intermediate d.c. voltage is able to reach the output of the circuit arrangement via the inductance coil.

In order to ensure a constant rated d.c. voltage at higher speeds, a voltage controller is fitted preferably between the first rectifier circuit and the first means, which generates the nominal d.c. voltage from the intermediate d.c. voltage when, at higher numbers of revolutions, the intermediate d.c. voltage is higher than the nominal d.c. voltage. In addition, by preference second means are provided which bridge the switching controller when the intermediate d.c. voltage is lower than the rated d.c. voltage. Hereby a power supply operating in two stages is realized. In the starting phase, the voltage controller is bridged and the rated d.c. voltage is generated from the (lower) intermediate d.c. voltage by means of upward transformation. In the normal operating phase the switching controller is switched off and the voltage controller is interconnected so that the rated d.c. voltage is generated from the (now higher) intermediate d.c. voltage by means of speed regulation. Further embodiments become apparent from the dependent claims.

BRIEF DESCRIPTION OF THE DRAWING

FIG. 1 is a schematic diagram of an electrical circuit according to a preferred embodiment of the present invention.

DETAILED DESCRIPTION OF THE PREFERRED EMBODIMENT

The circuit arrangement (10) described in FIG. 1 shows an input for the generator voltage (Ug) and two outputs for the positive rated d.c. voltage (Vcc+) and the negative d.c. voltage (Vcc−). The generator voltage (Ug) applied to the input is first rectified and smoothed in the first rectifier circuit comprised of a first diode (D1) and a first smoothing capacitor (C1) so that, at its output, an intermediate d.c. voltage (Uz) appears.

Behind the first rectifier circuit (D1, C1) an integrated voltage controller (Ic1) (e.g. of the type MC7812) with the resistors (R1) and (R2) is disposed. The longitudinal process control system of the voltage controller (Ic1) is bridgeable by means of a break contact element (Q), to which a diode (D2) is connected in parallel. The break contact element (Q) forms part of a relay (Re) which is located parallel to a further capacitor (C2) at the output of the voltage controller (Ic1). The relay (Re) is selected in such a way that it actuates when the voltage applied to it approaches the rated d.c. voltage (Vcc) or is approximately equal to this voltage. If the intermediate d.c. voltage (Uz) (e.g. in the starting phase) is clearly lower than the rated d.c. voltage Vcc, the relay (Re) remains off. The break contact element (Q) is closed and bridges the voltage controller (Ic1). The intermediate d.c. voltage (Uz) reaches a switching controller (Ic2) and an integrated voltage supply circuit (Ic3) via the break contact element (Q). The voltage controller (Ic1) only becomes effective when the generated voltage (Ug) or the intermediate d.c. voltage (Uz) derived therefrom is so high that the relay (Re) activates and opens the break contact element (Q). The increasing intermediate d.c. voltage (Uz) is then regulated by the voltage controller (Ic1) to the rated d.c. voltage (Vcc).

If the intermediate d.c. voltage (Uz) is lower than the rated d.c. voltage (Vcc) (break contact element (Q) closed; relay (Re) off), the intermediate d.c. voltage (Uz) is, with the aid of a circuit of a series induction coil (L) and switching controller (Ic2), controllably and upwardly transformed. The inductive voltage pulses arising from the inductive coil (L) are rectified with the aid of a second rectifier circuit of a diode (D3) and smoothing capacitor (C3) and passed in the form of a positive rated d.c. voltage (Vcc+) to the output. By way of example, a circuit of the type Sl 17661 can be considered as an integrated switching controller (Ic2). The third resistor (R3) is necessary for the operation of the switching controller (Ic2). The output voltage is tapped off for control purposes via an adjustable voltage divider comprised of a fourth resistor (R4) and a potentiometer (P).

The upward transformation of the voltage with the aid of (L) and the switching controller (Ic2) is necessary in portable machines such as chain saws or the like, especially at the starting up moment of the internal combustion engine. The starting speed in such machines amounts to approximately 1000 revs/min which normally provides adequate electrical power for heating the gripping handle of the chain saw or other implement. However, the voltage generated in the process is approximately 80% lower than the requisite operating voltage (rated d.c. voltage) as is required e.g. for an injection valve. The directly rectified and smoothed intermediate d.c. voltage (Uz) is supplied via the break contact element (Q) to the switching controller (Ic2) directly which increases the voltage via the inductive coil (L). The inductance voltage thusly obtained reaches the level of the necessary rated d.c. voltage.

If, when higher speeds are involved, the intermediate d.c. voltage (Uz) reaches the value of the rated d.c. voltage (Vcc), the switching controller (Ic2) is switched off and the intermediate d.c. voltage (Uz) passes the switching controller (Ic2) only via the inductive coil (L) and the diode (D3). At the same time, as described already in the foregoing, the break contact element (Q) is opened and regulation by the voltage controller (Ic1) reduces an increasing intermediate d.c. voltage (Uz) to the rated d.c. voltage (Vcc). Finally, in order to make available the negative nominal d.c. voltage (Vcc−) for the electronics, an integrated voltage supply circuit (Ic3) (e.g., of the type LT1073) with the capacitors (C4, C5) is provided, which operates to produce an output for the negative d.c. voltage (Vcc−).

In summary, the present invention provides the ability, especially with gas engine-powered portable machines such as chainsaws, to supply required electrical power to the fitted electronics without booster batteries, especially in the starting phase of engine operation. While the preferred embodiment of the present invention has been described herein, it is understood and acknowledged that variation and modification can be made without departing from the scope of the presently claimed invention.

What is claimed is:

1. A circuit arrangement for batteryless power supply of an electronic control of a machine, with a rated DC voltage, driven by an internal combustion engine, the machine possessing an AC voltage generator driven by the internal combustion engine which delivers a generated voltage dependent upon the revolutions per minute of the internal combustion engine, the circuit arrangement comprising:

a first rectifier circuit for converting the generated voltage into an intermediate DC voltage; and a first control means coupled to an output of the first rectifier circuit for generating the rated DC voltage from the intermediate DC voltage by means of controlled upwardly transforming the intermediate DC voltage level to the rated DC voltage level when the intermediate DC voltage level is lower than the rated DC voltage level.

2. A circuit arrangement as defined in claim 1, wherein the first control means includes a switching controller, a series inductance coil communicating with the switching controller, and a second rectifier circuit coupled to an output of the series inductance coil.

3. A circuit arrangement as defined in claim 2, wherein the second rectifier circuit includes a diode and a smoothing capacitor.

4. A circuit arrangement as defined in claim 1, further including a voltage controller disposed between the first rectifier circuit and the first control means such that the voltage controller generates the rated DC voltage from the intermediate DC voltage when the intermediate DC voltage level is higher than the rated DC voltage level.

5. A circuit arrangement as defined in claim 4, further including a second control means for providing a shunt path in parallel with the voltage controller when the intermediate DC voltage level is lower than the rated DC voltage level.

6. A circuit arrangement as defined in claim 5, wherein the second control means includes a relay and a break contact element, the break contact element being connected in parallel with the voltage controller, and the relay being acted upon by the intermediate DC voltage.

7. A circuit arrangement as defined in claim 6, wherein the relay is disposed between the voltage controller and the first control means.

8. A circuit arrangement as defined in claim 1, further including second control means for the generation of a negative rated DC voltage.

* * * * *